United States Patent
Du et al.

(10) Patent No.: US 10,917,379 B2
(45) Date of Patent: *Feb. 9, 2021

(54) DOMAIN INTERCOMMUNICATION IN SHARED COMPUTING ENVIRONMENTS

(71) Applicant: International Business Machines Corporation, Armonk, NY (US)

(72) Inventors: Kai Hong Du, Shanghai (CN); Zi Jin Tao, Wuxi (CN); Lu Zhang, Jiangsu (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,774

(22) Filed: Jan. 22, 2020

(65) Prior Publication Data
US 2020/0162416 A1 May 21, 2020

Related U.S. Application Data

(63) Continuation of application No. 16/106,494, filed on Aug. 21, 2018, now Pat. No. 10,581,794, which is a
(Continued)

(51) Int. Cl.
*G06F 15/16* (2006.01)
*H04L 29/12* (2006.01)
(Continued)

(52) U.S. Cl.
CPC ........ *H04L 61/103* (2013.01); *G06F 9/45533* (2013.01); *G06F 9/45558* (2013.01);
(Continued)

(58) Field of Classification Search
CPC ............... H04L 61/103; H04L 12/4641; G06F 9/45558; G06F 9/50; G06F 9/45533; G06F 2009/45595
See application file for complete search history.

(56) References Cited

U.S. PATENT DOCUMENTS 8,606,967 B2 12/2013 Narayanan et al.
10,079,798 B2 9/2018 Du et al.
(Continued)

FOREIGN PATENT DOCUMENTS

WO WO 2014087591 12/2014
WO WO 2015100656 9/2015

OTHER PUBLICATIONS

Mell et a., "The NIST DEfinition of Cloud Computing", Ntional Institute of Standards and Technology, U.S. Department of Commerce, NIST Special Publication 800-145, Sep. 2011, 7 pages.
(Continued)

*Primary Examiner* — John B Walsh
(74) *Attorney, Agent, or Firm* — Heslin Rothenberg Farley & Mesiti P.C.; Stephanie Carusillo

(57) ABSTRACT

A method, system, and computer program product for enabling communication between different overlay solutions. The method includes one or more processor obtaining an address resolution request from a first resource in a first domain for a second resource in a second domain. Both domains are in a shared computing environment and the second domain includes a control plane engine. The one or more processor obtains source information from the request, registers the information to the engine, and utilizes the request to query the engine to locate the second resource in the domain. The second resource matches the request. The processor receives a response from the engine identifying a first host and the first host is in the second domain and is the host of the second resource. The processor sends a notification request to the first host requesting that the first host reply to the request.

20 Claims, 9 Drawing Sheets

Related U.S. Application Data continuation of application No. 14/921,294, filed on Oct. 23, 2015, now Pat. No. 10,079,798.

(51) Int. Cl.
*H04L 12/46* (2006.01)
*G06F 9/455* (2018.01)
*G06F 9/50* (2006.01)

(52) U.S. Cl.
CPC ............ *G06F 9/50* (2013.01); *H04L 12/4641* (2013.01); *G06F 2009/45595* (2013.01)

(56) References Cited

U.S. PATENT DOCUMENTS

| | | | |
|---|---|---|---|
| 10,581,794 B2* | 3/2020 | Du | .................... H04L 61/103 |
| 2008/0301322 A1 | 12/2008 | Horibe et al. | |
| 2011/0317703 A1 | 12/2011 | Dunbar et al. | |
| 2012/0275787 A1 | 11/2012 | Xiong et al. | |
| 2013/0254359 A1 | 9/2013 | Boutros | |
| 2014/0269702 A1 | 9/2014 | Moreno | |
| 2015/0058968 A1 | 2/2015 | Wang et al. | |
| 2015/0124809 A1 | 5/2015 | Edsall et al. | |
| 2016/0197876 A1 | 7/2016 | Bui et al. | |
| 2017/0118166 A1 | 4/2017 | Du et al. | |
| 2018/0359212 A1 | 12/2018 | Du et al. | |

OTHER PUBLICATIONS

List of IBM Patents or Applications Treated as Related, Jan. 31, 2020, 2 pages.

Zhao et al., Handbook of Research on Redesigning the Future of Internet Architectures, "Recent Advances in Traffic Forwarding Techniques", igi-global.com, Chapter 12, 2015, pp. 267-302.

\* cited by examiner

600

615

Program obtains an address resolution request from a first resource in a first domain for a second resource in a second domain

625

Program obtains origination information from the address resolution request, registers the origination information to a control plane engine, and queries the control plane engine to locate the second resource, where the second resource matches the address resolution request

635

Program receives a response from the control plane engine identifying a host in the second domain of the second resource identified in the address resolution request.

645

Program sends a notification request to the (identified) host requesting that the host reply to the address resolution request.

Program obtains a request for a host address endpoint in a first domain from a domain control plane engine in the second domain (request was originally made to the domain control plane engine by a source endpoint in the second domain).

825

Program sends a multicast address query to hosts in the first domain.

835

Responsive to the address query, program receives a response from a host in the first domain.

845

Program sends the response to the control plane engine of the second domain to register the resource from the first domain in the control plane engine.

855

Control plane engine responds to the source endpoint in the second domain with the destination endpoint mapping information from the first domain, enabling the source in the second domain to send traffic to the destination in the first domain.

FIG. 8

DOMAIN INTERCOMMUNICATION IN SHARED COMPUTING ENVIRONMENTS

TECHNICAL FIELD

One or more aspects of the present invention relates to enabling communication between different overlay solutions in a shared computing environment.

BACKGROUND

In order to deploy seemingly dedicated resources to users of a shared computing environment, including but not limited to a cloud computing system, different solutions are introduced that create overlay networks on top of existing networks, by generating logical communication links between hosts within a service domain. One approach to implementing an overlay network includes tunneling, where a delivery network protocol encapsulates a payload protocol. However, various implementations of overlay network solutions are not always compatible with each other or able to communicate with each other. Two such approaches are Virtual Extensible Local Area Network (VXLAN) and Centralized NVO3 Implementation (CNI), as they differ in their implementations about the Control Planes (CPs), though they have the same frame encapsulation. Devices in one area of a computing environment utilizing VXLAN cannot communicate with devices in another area of a computing environment using CNI and vice versa because tunnel information from one solution cannot be introduced in the other.

VXLAN and CNI communicate in different ways in the CP. VXLAN has no dedicated CP and uses multicast tunnels for address resolution. CNI uses a centralized policy server, including a centralized controller and a centralized policy manager, to support tunnel resolution instead of the relying on a multicast query scheme, which is the core tunnel resolution mechanism of VXLAN. In CNI, tunnel endpoints are registered on the controller. Thus, a VM hosted in a VXLAN domain cannot communicate with a VM hosted in a CNI domain directly over an overlay network because of different address resolve mechanisms in the CP, even if both VMs use a VXLAN frame for tunneling.

SUMMARY

Shortcomings of the prior art are overcome and additional advantages are provided through the provision of a method of enabling communication between two domains in a shared computing environment. The method includes, for instance: obtaining, by the one or more processor, an address resolution request from a first resource in a first domain for a second resource in a second domain, wherein a shared computing environment comprises the first domain and the second domain, and wherein the second domain comprises a control plane engine; obtaining, by the one or more processor, source information from the address resolution request; registering, by the one or more processor, the source information to the control plane engine, and utilizing the address resolution request to query the control plane engine to locate the second resource in the domain, wherein the second resource matches the address resolution request; receiving, by the one or more processor, a response from the control plane engine identifying a first host, wherein the first host is in the second domain and is the host of the second resource; and sending, by the one or more processor, a notification request to the first host requesting that the first host reply to the address resolution request.

Shortcomings of the prior art are overcome and additional advantages are provided through the provision of a computer program product to of enable communication between two domains in a shared computing environment. The computer program product includes, for instance, a computer readable storage medium readable by a processing circuit and storing instructions for execution by the processing circuit for performing a method including: obtaining, by the one or more processor, an address resolution request from a first resource in a first domain for a second resource in a second domain, wherein a shared computing environment comprises the first domain and the second domain, and wherein the second domain comprises a control plane engine; obtaining, by the one or more processor, source information from the address resolution request; registering, by the one or more processor, the source information to the control plane engine, and utilizing the address resolution request to query the control plane engine to locate the second resource in the domain, wherein the second resource matches the address resolution request; receiving, by the one or more processor, a response from the control plane engine identifying a first host, wherein the first host is in the second domain and is the host of the second resource; and sending, by the one or more processor, a notification request to the first host requesting that the first host reply to the address resolution request.

Computer systems and methods relating to one or more aspects of the technique are also described and may be claimed herein. Further, services relating to one or more aspects of the technique are also described and may be claimed herein.

Additional features and are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

FIG. 6 depicts a workflow of an embodiment of the present invention;

FIG. 8 depicts a workflow of certain aspects of an embodiment of the present invention.

DETAILED DESCRIPTION

Figure 1:
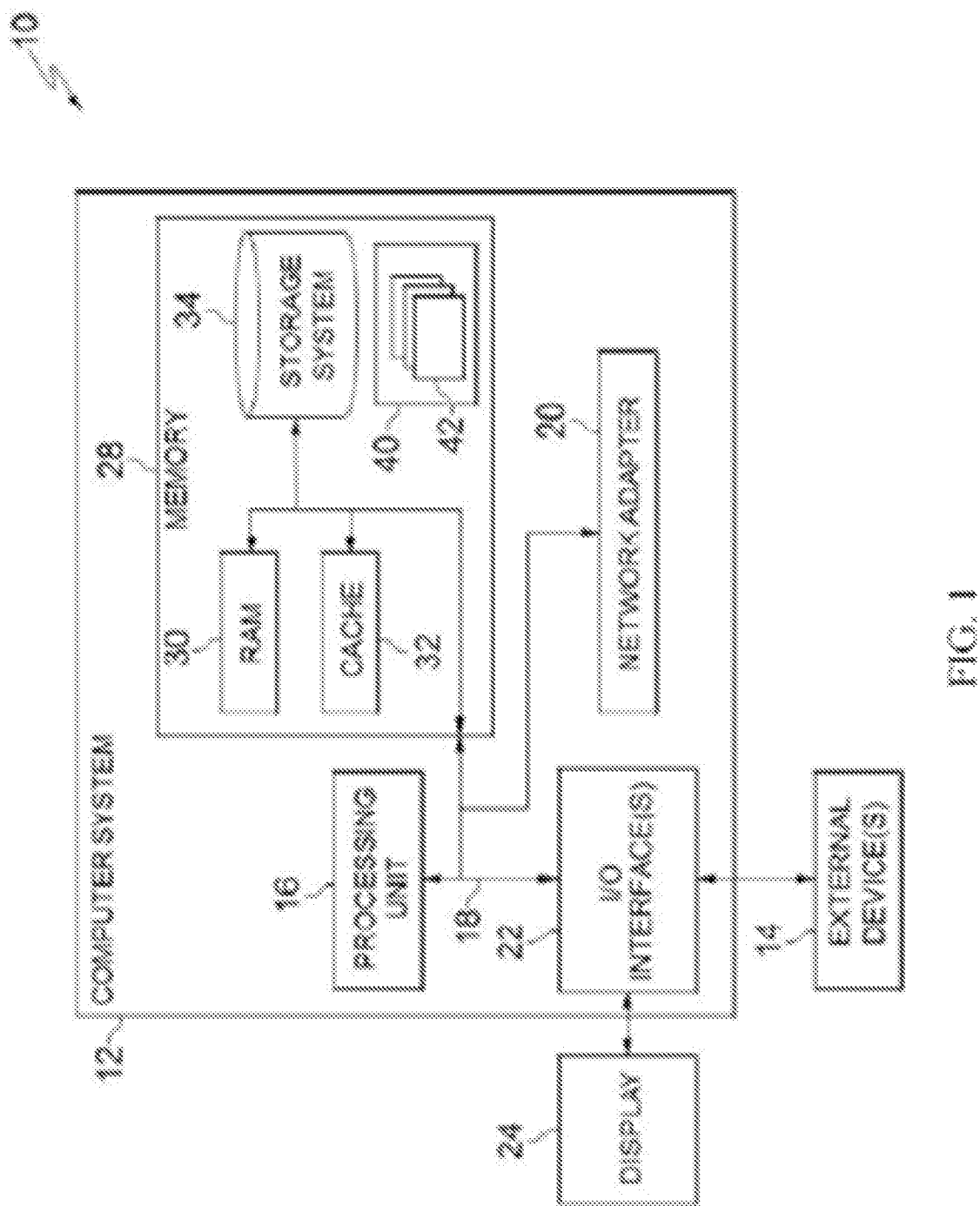
FIG. 1 depicts a cloud computing node, in accordance with one or more embodiments set forth herein.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

An embodiment of the present invention enables computing resources upon which the desperate solutions described above have been implemented to communicate directly. As described above, in a shared computing environment, including but not limited to a cloud computing system, when a VM hosted in a VXLAN domain cannot communicate directly with a VM hosted in CNI domain by overlay network, or vice versa, because VXLAN and CNI utilize different address resolve mechanisms in the CP. VXLAN and CNI domains cannot communicate directly in this manner despite the fact that both may use a VXLAN frame for tunneling. Although VXLAN and CNI are used as examples throughout this paper, one of skill in the art will recognize that aspects of certain embodiments of the present invention may be adapted to enable communication over an overlay network of resources that due to certain technical limitations, cannot communicate directly.

VXLAN and CNI were selected as examples because they communicate in different ways in the CP.

VXLAN has no dedicated CP, thus, there is no out-of-band mechanism that could be used for a VM to discover another host in its segment, including a host's Media Access Control (MAC) address and VXLAN Tunnel Endpoint (VTEP) IP addresses, or any other relevant connectivity information. Instead, VXLAN uses existing layer 2 mechanisms such as flooding and dynamic MAC learning. Layer 2 broadcast is replaced by IP multicast, by mapping a VXLAN segment to an IP multicast address, limiting the layer 2 broadcast transmissions to servers hosting VMs in the same VXLAN segment. VTEPs can join or leave multicast groups as needed, using The Internet Group Management Protocol (IGMP) (IGMP). Then, Address Resolution Protocol (ARP) is implemented over IP multicast to resolve MAC-to-VTEP mappings.

Unlike in VXLAN, in CNI, data traffic is handled by distributed data plane entities, each called a Network Virtualization Edge (NVE) while control is achieved through a CP engine called Network Virtualization Authority (NVA). The NVE entities are in charge of connectivity and policy enforcement in a CNI environment, and get the respective control information from NVA (if not available in local cache). Typically, a NVE is located on a physical server, and serves the VMs hosted by this server. Traffic sent and received by a VM traverses its hosting NVE and the NVA maintains the logical view of the network. When an NVA detects the need to resolve an endpoint address in the CNI domain and it is not aware of the NVE that hosts that endpoint, the NVA sends an address resolution request to all the NVA Clients on NVE that are known to host Endpoints from a specific domain. The NVE that finds the requested Endpoint sends a reply, and the NVA updates its database.

An embodiment of the present invention includes a method for communicating information between two control planes in a shared computing environment where resources utilizing the network virtualization technologies employed cannot communicate with each other directly utilizing an overlay network because each network virtualization technology communicates in a different way in its respective CP. An embodiment of the present invention may also include a method that enables a resource utilizing the first of these network virtualization technologies to make a request directly to a resource utilizing the second of these network virtualization technologies and receive a direct reply.

Certain embodiments of the present invention may offer various technical computing advantages, including increasing the computing efficiency of shared computing environments and enabling users to make better use of resources available in such an environment. For example, certain embodiments of the present invention utilize the existing infrastructure of a shared computing environment, thus, no additional investment in resources is required to implement these embodiments of the present invention. Certain embodiments of the present invention offer a user a flexible solution to upgrade existing networks by enabling elements of a network to communicate directly that were formerly unable to communicate directly. Certain embodiments of the present invention enable a user to merge different existing overlay networks. Implementing certain embodiments of the present invention can enhance the performance of a shared computing environment as the direct communication between resources using different network virtualization technologies is possible, increasing the efficiency of a system as a whole. Specifically, use of certain embodiments of the present invention eliminates the 4K VLAN limitation which is a typical limitation of a VXLAN. Aspects of certain embodiments of the present invention enable IP unicast communication between VXLAN domains and CNI domains to be compatible without requiring major changes to the existing structure of the shared computing environment where these two solutions were implemented. Another advantage of certain embodiments is that compared with the traditional gateway meanings, in these select embodiments, there are no centralized facilities to transfer between the two types of overlay networks. Rather, VXLAN header encapsulation/de-capsulation is handled by each NVE in the corresponding domain, so there is not a performance bottleneck or single point of failure.

As discussed above, certain embodiments of the present invention enable virtual resources deployed in a middleware layer in a cloud computing environment to communicate with each other directly despite the resources utilizing traditionally incompatible network virtualization technologies. Thus, certain embodiments of the present invention are particularly relevant to increasing the efficiency and communications within a cloud computing environment.

FIGS. 1-4 depict various aspects of computing, including cloud computing, in accordance with one or more embodiments set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, mobile devices, personal data assistants, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
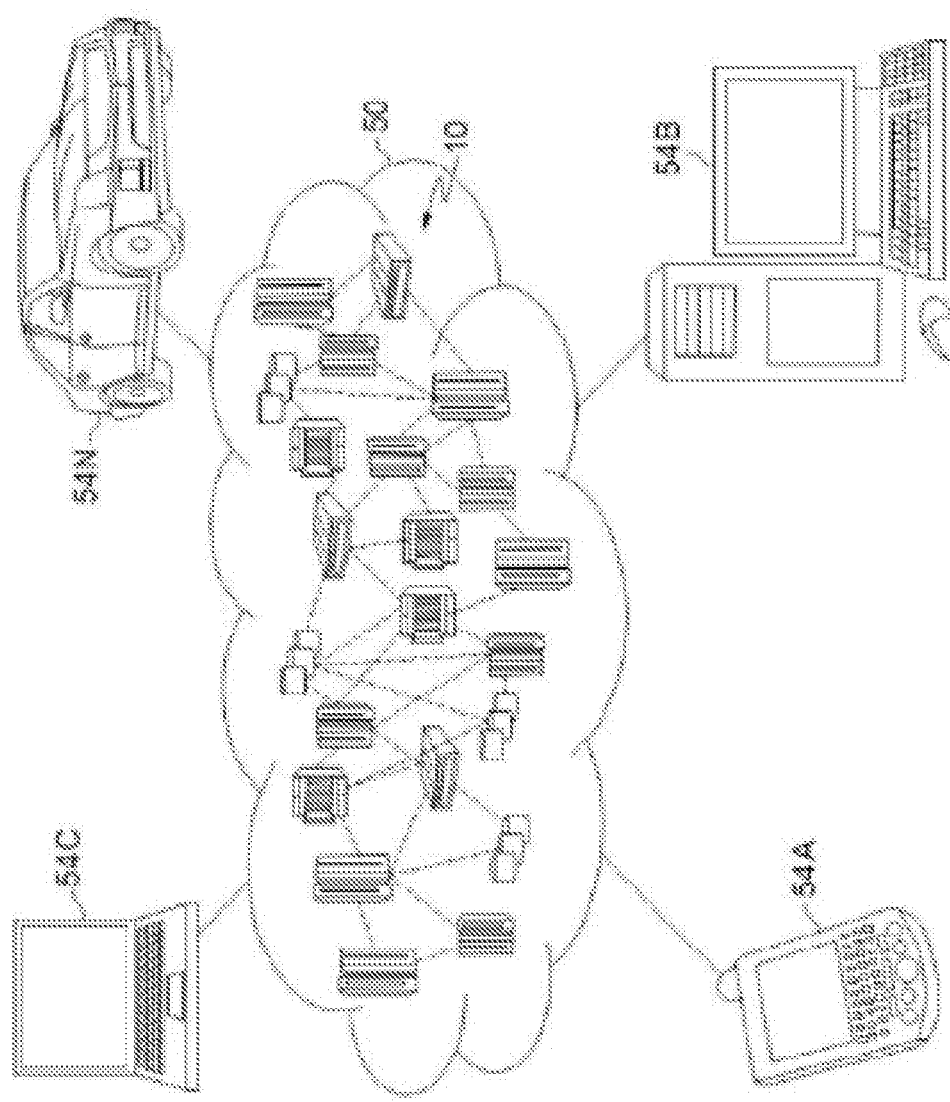
FIG. 2 depicts a cloud computing environment, in accordance with one or more embodiments set forth herein.

Referring now to FIG. 2, an illustrative cloud computing environment is depicted, in accordance with one or more embodiments set forth herein. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
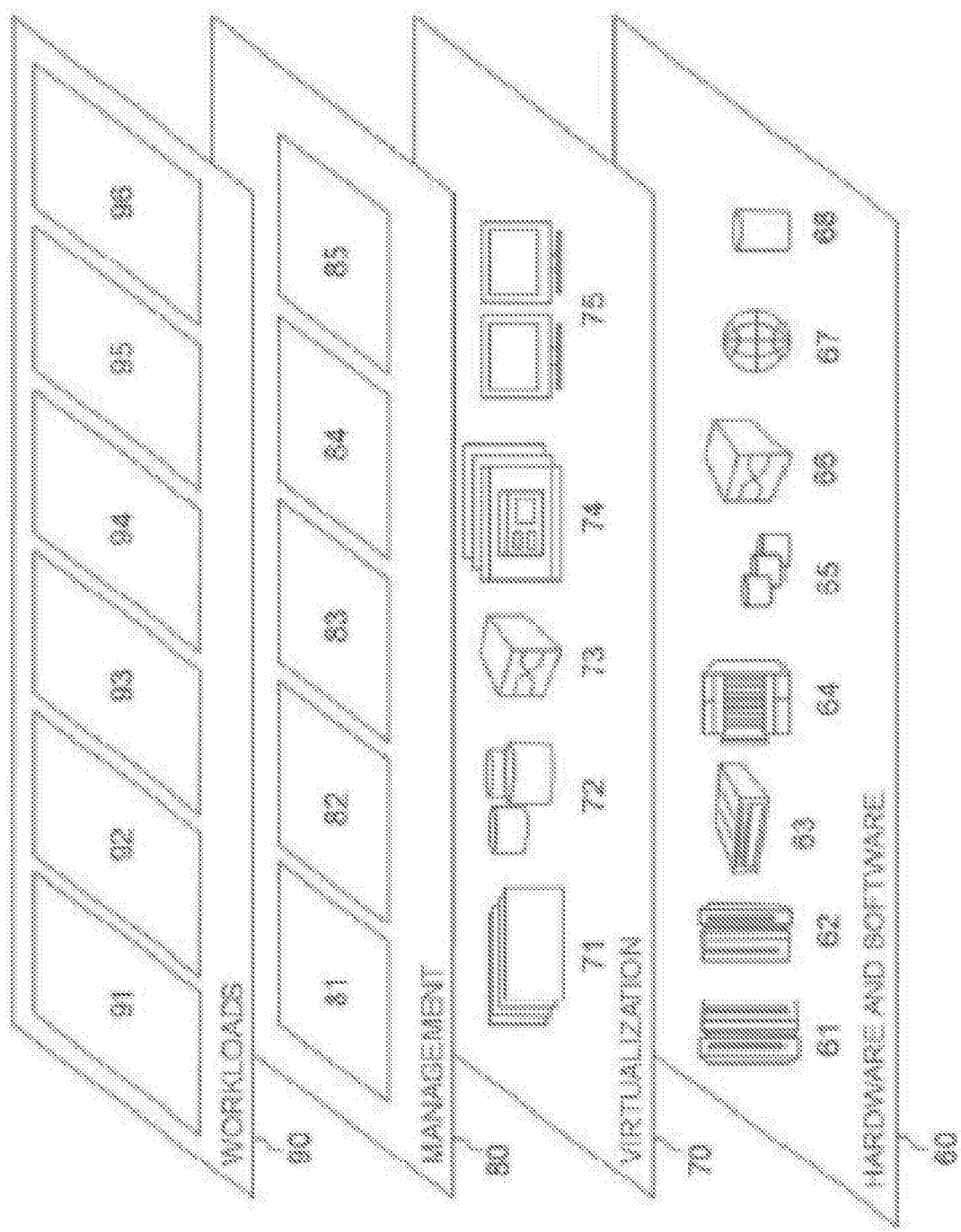
FIG. 3 depicts abstraction model layers, in accordance with one or more embodiments set forth herein.

Referring now to FIG. 3, a set of functional abstraction layers provided by cloud computing environment 50 (FIG. 2) is shown, in accordance with one or more embodiments set forth herein. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enabling communication between different overlay solutions 96, as described herein.

Figure 4:
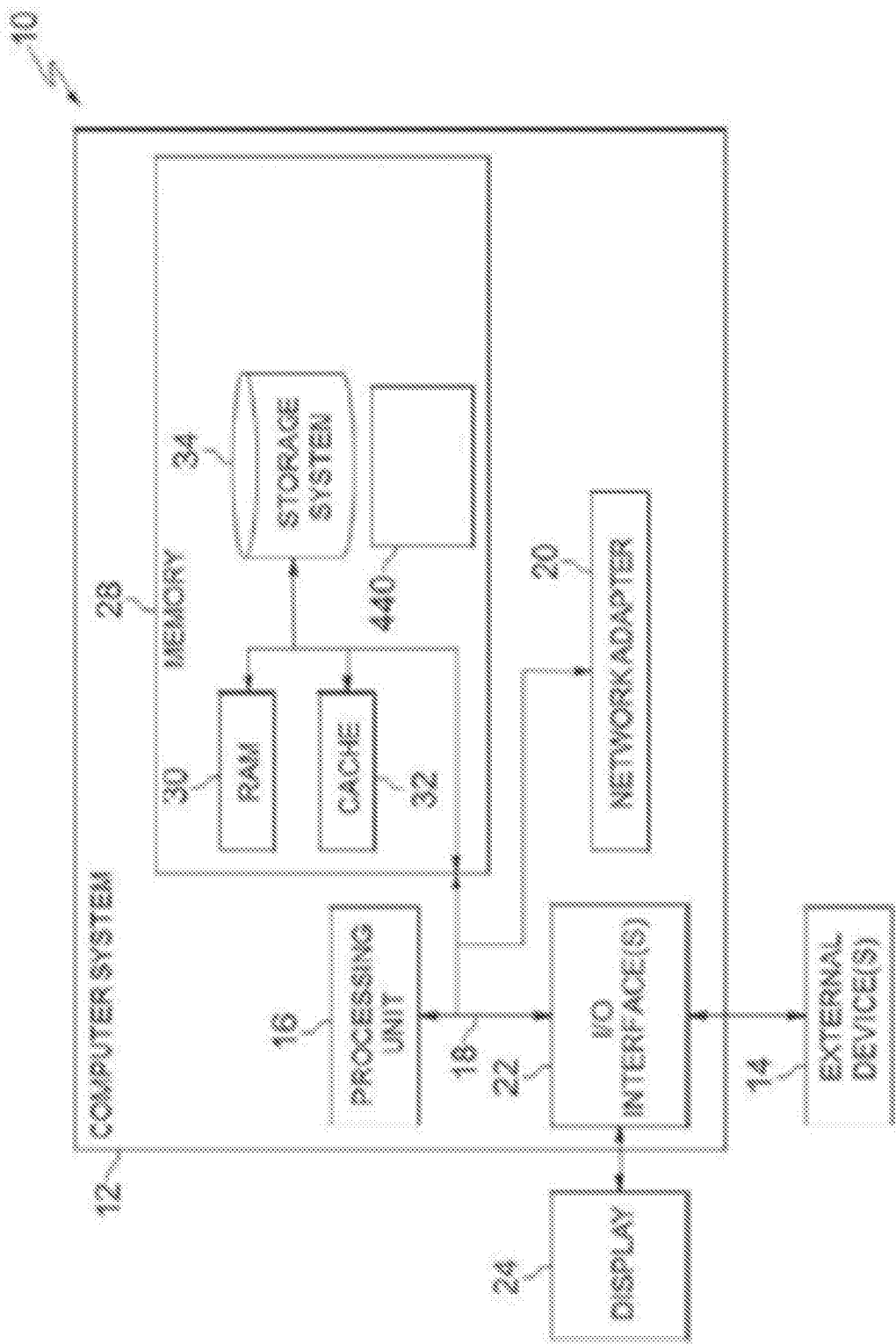
FIG. 4 depicts a hardware overview of a computing node, in accordance with one or more embodiments set forth herein.

FIG. 4 depicts a hardware overview of a computing node 10, in accordance with one or more embodiments set forth herein.

Program/utility 40 as set forth in FIG. 1 can include one or more program 440 as set forth in FIG. 4, and can provide the functionality of enabling communication between different overlay solutions 96 as set forth in FIG. 3.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As aforementioned, aspects of various embodiments of the present invention include a method for enabling communication between different overlay solutions in a shared computing environment. Throughout this specification, one or more cloud computing environments 50 (FIG. 2) may be referenced or pictures may be provided to represent one type of computing environment into which aspects of the present invention may be deployed. However, the cloud computing environment 50 (FIG. 2) is merely one example of an environment is which advantages of certain aspects of some embodiments of the present invention may be realized.

In an embodiment of the present invention, in order to resolve communication between a VXLAN domain and a CNI domain, two elements are implemented in a shared computing environment. A first element, which can be referred to as an Overlay Ferry Proxy (OFP), ferries control plane information. A second element, which may be referred to as a VXLAN Relay Agent (VRA), enables resources in a CNI domain to communicate with resources in a VXLAN domain by enabling the CNI resources to communicate with the VXLAN resources driven by the OFP.

Figure 5:
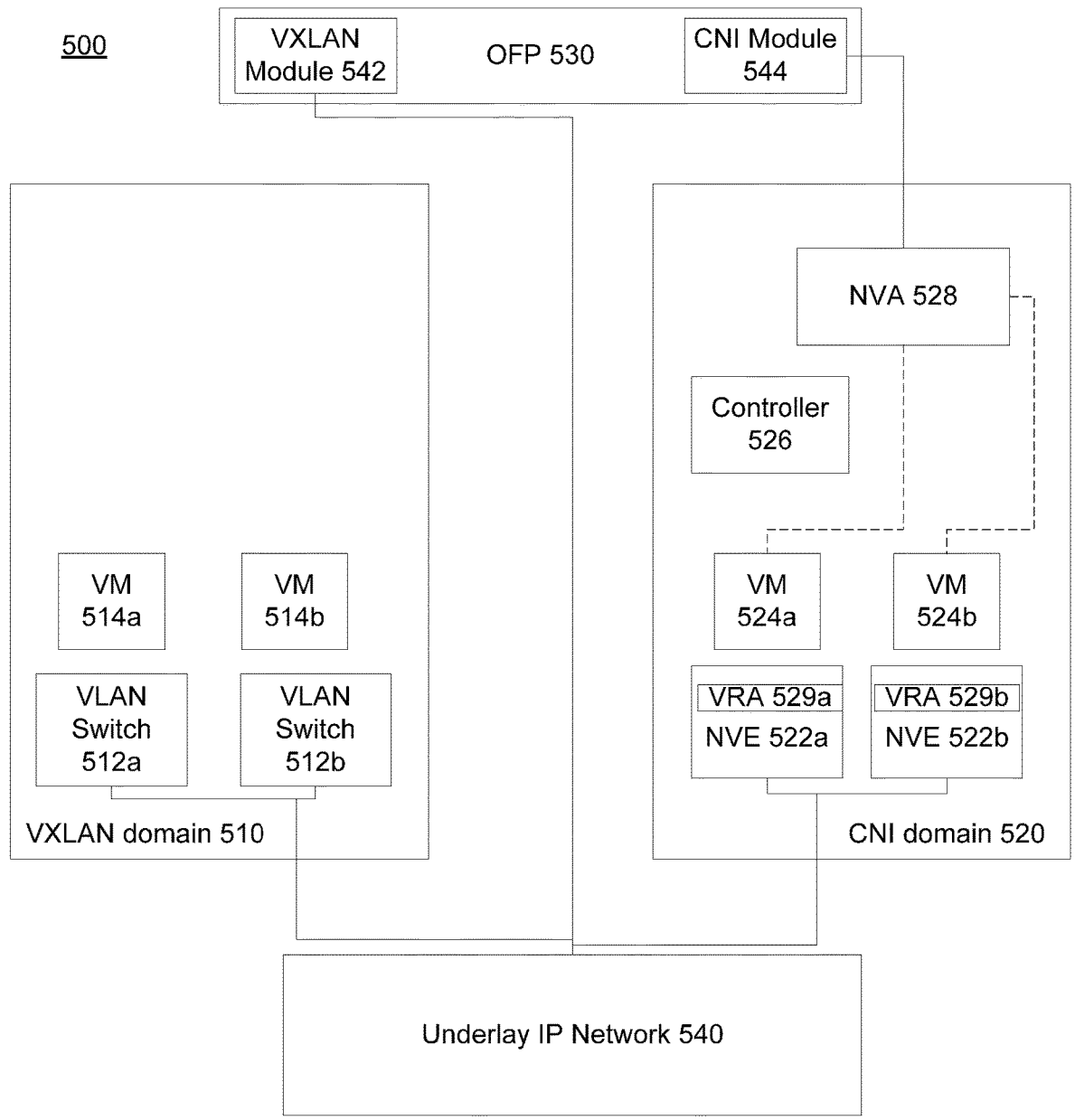
FIG. 5 depicts an example topography of a shared computing environment where aspects of certain embodiments of the present invention may be implemented.

FIG. 5 depicts an example topography of a shared computing environment where aspects of certain embodiments of the present invention may be implemented. This shared computing environment includes resources utilizing a VXLAN and CNI overlay solutions. The resources use these respective overlay solutions are depicted as a VXLAN domain 510 and a CNI domain 520. This technical environment will be used to illustrate certain aspects of certain embodiments of the present invention. Specifically, FIG. 5 will illustrate how one or more program 440 (FIG. 4), which may be included in an OFP and/or one or more VRA, can enable resources from two incompatible domains within a shared computing environment to communicate with each other directly.

Referring to FIG. 5, certain aspects of an embodiment of the present invention are implemented in the shared computing environment 500. As seen in FIG. 5, VXLAN domain 510, which can be understood as a first domain, includes VXLAN switches 512a-512b and VMs 514a-514b. The CNI domain 520, which can be understood as a second domain, includes NVEs 522a-522b, VMs 524a-524b, a controller 526, and an NVA 528. Both the VXLAN domain 510 and the CNI domain 520 overlay an Underlay IP Network 540, which comprises the real (not virtual) resources of the shared computing environment 500. An embodiment of the OFP 530 of the present invention is also depicted in FIG. 5 as ferrying communications between CPs utilizing a VXLAN Module 542 and a CNI Module 544 to communicate between the respective solutions. In an embodiment of the present invention, each NVE 522a-522b includes a VRA 529a-529b such that one or more program 440 can reply to ARP requests from the VXLAN domain 510 (e.g., the VXLAN domain) in the VXLAN way directly by communicating with the OFP 530.

The OFP 530 includes one or more program 440 (FIG. 4) to communicate information between CPs in a shared computing environment. In an embodiment of the present invention, one or more program 440 joins a corresponding multicast group to receive ARP requests from a domain where the VXLAN domain 510 is implemented. In an embodiment of the present invention, the one or more program 440 will register virtual networks in the NVA 528. In an embodiment of the present invention, the one or more program 440 will register each virtual network by the virtual network ID (VNID) of each network. The one or more program 440 forms a proxy between the overlay networks of the VXLAN domain 510 and the CNI domain 520. As a proxy, the one or more program 440 receives an ARP from the VXLAN domain 510, decapsulates the header and registers the request in the NVA 528 of the CNI domain 520. Conversely, the one or more program 440 receives a lookup from the NVA 528 for an endpoint (e.g., VM), in a certain VNID and the one or more program 440 converts the lookup to a VXLAN query (i.e., an IP multicast for the VNID) into the VXLAN domain 510.

The NVEs 522a-522b that include VRA 529a-529b in the CNI domain 520 include one or more program 440 (FIG. 4) as well. In an embodiment of the present invention, the one or more program 440 obtains ARP requests from the VXLAN domain 510 and replies to these requests via the OFP 530.

FIG. 6 depicts a workflow of an embodiment of the present invention, specifically, an example of how a resource in a first domain resolves a resource in the second domain in accordance with some aspects of this embodiment of the invention. In an embodiment of the present invention where the first domain is a VXLAN domain and the second domain is a CNI domain, FIG. 6 is an example of how a resource, including by not limited to a VM in a VXLAN domain, resolves an endpoint, including but not limited to a VM, in a CNI domain. The first domain and the second domain both overlay the same shared computing environment, which may include, but is not limited to, a cloud computing environment.

For ease of understanding, the elements in FIG. 5 are referred to throughout the description of workflow 600. However, the use of this example is only meant as one possible illustration and is not meant as an exclusive topography. The communication between the VXLAN domain 510 and the CNI domain 520 is handled by a proxy, which, in an embodiment of the present invention, includes OFP 530. Specifically, FIG. 6 depicts an element in VXLAN domain 510 initiating a communication with an element of CNI domain 520, and the element of the VXLAN domain 510 receiving a response. As aforementioned, the purpose of the communication can be for elements in the VXLAN domain 510 (e.g., VMs) to resolve endpoints in the CNI domain 520 (e.g., VMs). In an embodiment of the present invention, one or more program 440 (FIG. 440) executing on a resource in the VXLAN domain 510, for example, the resource may be a VM 514a-514b and the one or more program 440 may obtain the request from this resource via a VXLAN switch 512b. The first resource may request the destination endpoint tunnel IP for a host in the CNI domain 520. As explained in more detail below, in an embodiment of the present invention, an element in the CNI domain 520, for example, destination NVE 522a, carrying the destination VM 524a, may respond to the request.

Returning to FIG. 6, in accordance with an embodiment of the present invention, one or more program 440 (FIG. 4) obtains an address resolution request from a first resource in a first domain for a second resource in a second domain (615). In an embodiment of the present invention, the one or more program 440 obtains the address resolution request utilizing an Address Resolution Protocol (ARP). In this example, the one or more program 440 obtains an ARP request to find a destination VM MAC address. In an embodiment of the present invention, the first domain does not have a dedicated CP and/or the second domain has a CP engine that is communicatively coupled to a centralized controller upon which the resource is registered. In an embodiment of the present invention, the first domain is VXLAN domain 510. In a further embodiment of the present invention, the second domain is CNI domain 520. In a further embodiment of the present invention, the one or more program 440 obtains the address resolution request from a switch in the first domain. In an embodiment of the present invention, the request is an encapsulated packet. The encapsulated packet may have been encapsulated by a VXLAN switch in the first domain, which encapsulated the address resolution request (e.g., ARP request) with a VXLAN header. In an embodiment of the present invention, the address resolution request may be multicast to hosts in a common multicast group and the proxy that will enable communication between the two domains, including but not limited to OFP 530 is an example, is a member of this common multicast group.

The one or more program 440 obtains source information from the address resolution request, registers the source information to a CP engine in the second domain, and queries the CP engine to locate the second resource in the second domain, where the second resource matches the address resolution request (625). In an embodiment of the present invention, the CP engine is an NVA. In an embodiment of the present invention, the source information comprises the source VM tunnel resolution information from the first domain. In an embodiment of the present invention, if the source information is already registered in the CP engine, the one or more program 440 will update the existing information in the CP engine in accordance with the address resolution request. The query may include checking data in an NVA to see if there is an endpoint (e.g., a VM) that matches the request.

Based on querying the CP engine, the one or more program 440 receives a response from the CP engine identifying a host in the second domain of the second resource identified in the address resolution request (635). There are a number of ways that the control plane engine can identify the second resource. First, the information identifying the host may be accessible to the one or more program 440 directly in the CP engine. However, responsive to the query, one or more program 440 may send a broadcast to various hosts in the second domain looking for the second resource in the second domain. In the example where the second domain is a CNI domain, the CP engine may employ a CNI native tunnel resolution mechanism in making this broadcast.

In an embodiment of the present invention, the one or more program 440 sends a notification request to the (identified) host requesting that the host reply to the address resolution request (645). In an embodiment of the present invention, the one or more program 440 sends this notification request to a VRE located in the host; the host itself may be a destination NVE. In an embodiment of the present invention, the notification request includes an instruction to reply to the address resolution request in a format native to the first domain. For example, if the first domain is a VXLAN domain, the request may include an instruction to respond with a reply (e.g., an ARP reply), which is encapsulated with a VXLAN encapsulation, which is a format utilized in a VXLAN domain. In an embodiment of the present invention, the host's reply to the request is a unicast reply. In an embodiment of the present invention, a VRA module located in the identified host sends replies directly to the first source. For example, in an embodiment of the present invention, the VRA module 529a-529b sends an ARP reply with VXLAN encapsulation directly to the source endpoint (i.e., the first source) in the VXLAN domain (i.e., the first domain).

In an embodiment of the present invention, in addition to an element in the first domain communicatively coupled to the first resource receiving the reply (e.g., an encapsulated VXLAN ARP reply), the element also receives information about the source of this reply. For example, this element, which can be, in one example, VXLAN switch 512a-512b, may receive the destination tunnel IP. In an embodiment of the present invention, the element will process the reply, which may include but is not limited to decapsulating the VXLAN header of the reply, and forward this reply, which may be, for example, an ARP reply, to the first resource, which in an embodiment of the present invention, is VM source VM 514a-514b. Upon completion of the request and reply sequence, the first resource and the second resource have exchanged information and have data related to other IP-MAC mapping. In an embodiment of the present invention, the VXLAN switch and the NVE also have exchanged mappings and thus, these elements can send data to each other via unicast.

Figure 7:
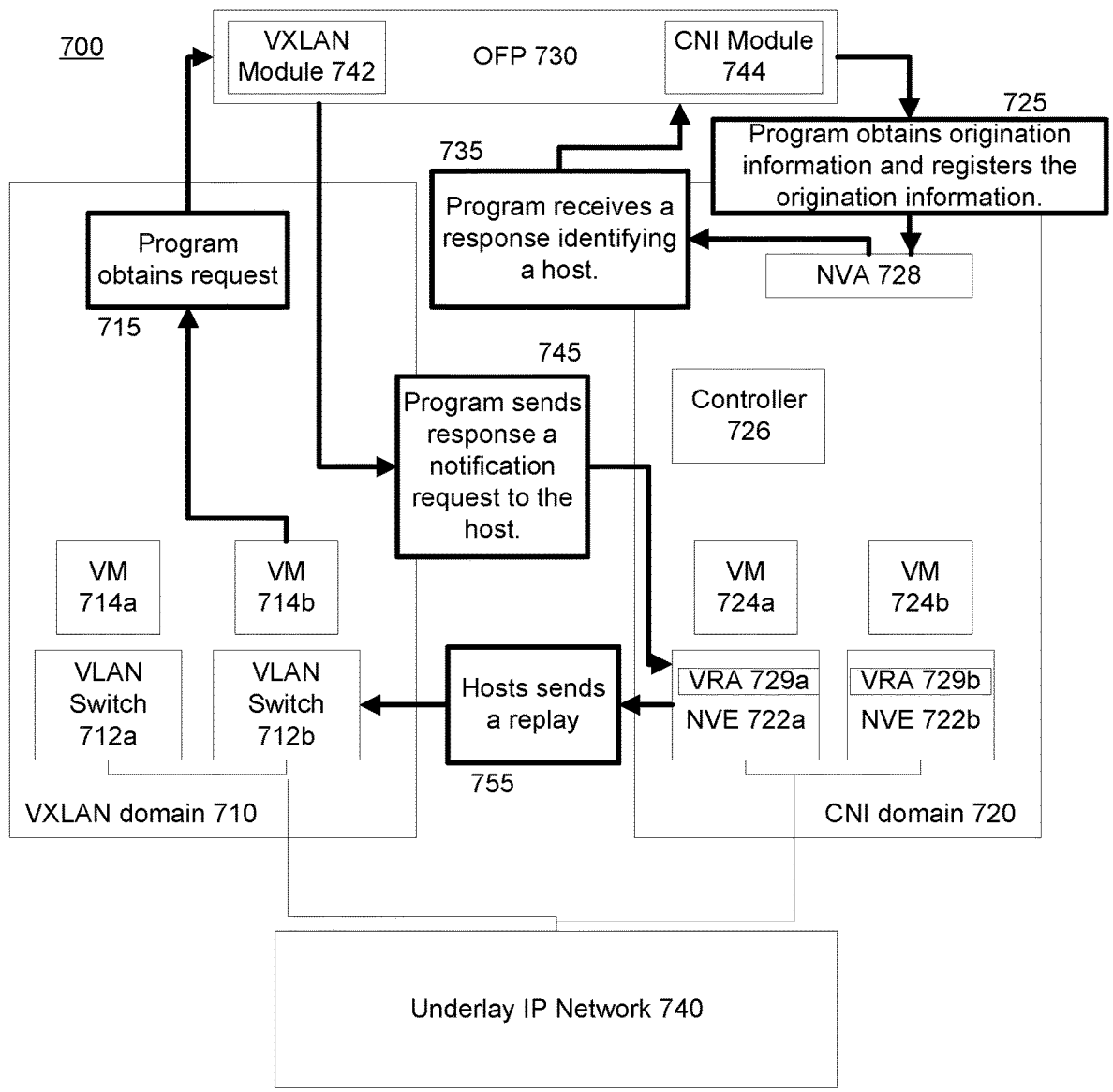
FIG. 7 depicts certain aspects of an embodiment of the present invention utilizing the architecture depicted in FIG. 5.

FIG. 7 depicts certain aspects of an embodiment of the present invention utilizing the architecture depicted in FIG. 5. As aforementioned, this architecture provides one example of a possible topography for a system into which aspects of the present invention may be implemented. This is merely one example of an implementation, as understood by one of skill in the art. Certain connections between architectural elements in FIG. 5 were removed in FIG. 7 (as well as in FIG. 9) for illustrative purposes, in order to make the figure easier to follow. Overlaying aspects of embodiments of the present invention on an example architecture assists in illustrating aspects of the invention, which is why this technique is employed herein.

As illustrated in FIG. 7, one or more program 440 creates a proxy, e.g., OFP 730, to ferry communication between two domains and implements a relay agent on a host in the domain. VRA 729a-729b, which are part of NVE 722a-722b, are examples of relay agents. Each domain uses a network overlay solution and these domains both overlay a common Underlay IP Network 740 in a shared computing environment. One or more program 440 obtains an address resolution request from a first resource in a first domain, a VXLAN domain 710, for a second resource in a second domain, a CNI domain 720 (715). One or more program 440 obtains source information from the request, registers the source information to a CP engine, e.g., NVA 728, and queries the CP engine to locate the second resource in the second domain matching the address resolution request (725). The one or more program 440 receives a response from the control plane engine identifying a host (e.g., NVE 722a-722b) in the second domain of the second resource identified in the address resolution request (735). The resources in this domain include VMs 724a-724b. One or more program 440 sends a notification request to the host requesting that the host reply to the address resolution request in a specified format (745). The VRA module 729a sends a reply (e.g., an ARP reply), in the specified format (e.g., with VXLAN encapsulation) directly to the first resource, the source endpoint, in the first domain, a VXLAN domain 710 (755). As seen in FIG. 7, both the request and the reply are processed by a switch in the first domain 710 either after or in advance of being obtained by the first resource, a VM 714b. As is depicted in FIG. 7, the VXLAN switch 712b and the NVE 722a serve as gateways to access VM 714b and VM 724a, respectively. Similarly, had the example utilized different resources in the environment, VXLAN switch 712a and the NVE 722b could also serve as gateways, and these gateways would enable access to VM 714a and VM 724b.

In an embodiment of the present invention, communications to the OFP 730 to and from the VXLAN domain 710 may be received and sent by a VXLAN Module 742 in the OFP 730. Communications to and from the CNI domain 720 may be received and sent by a CNI Module 744 in the OFP 930. In an embodiment of the present invention, endpoints may be registered on the controller 726.

The format and contents of the query the one or more program 440 makes to a CP engine may vary. In an embodiment of the present invention, this query may include some of the following information: Target VNID, Packet type:

ARP Response, Source NVE (Tunnel Endpoint) IP, Source VM IP address, Source VM MAC address, Destination VM IP address, Destination VM MAC address.

Figure 9:
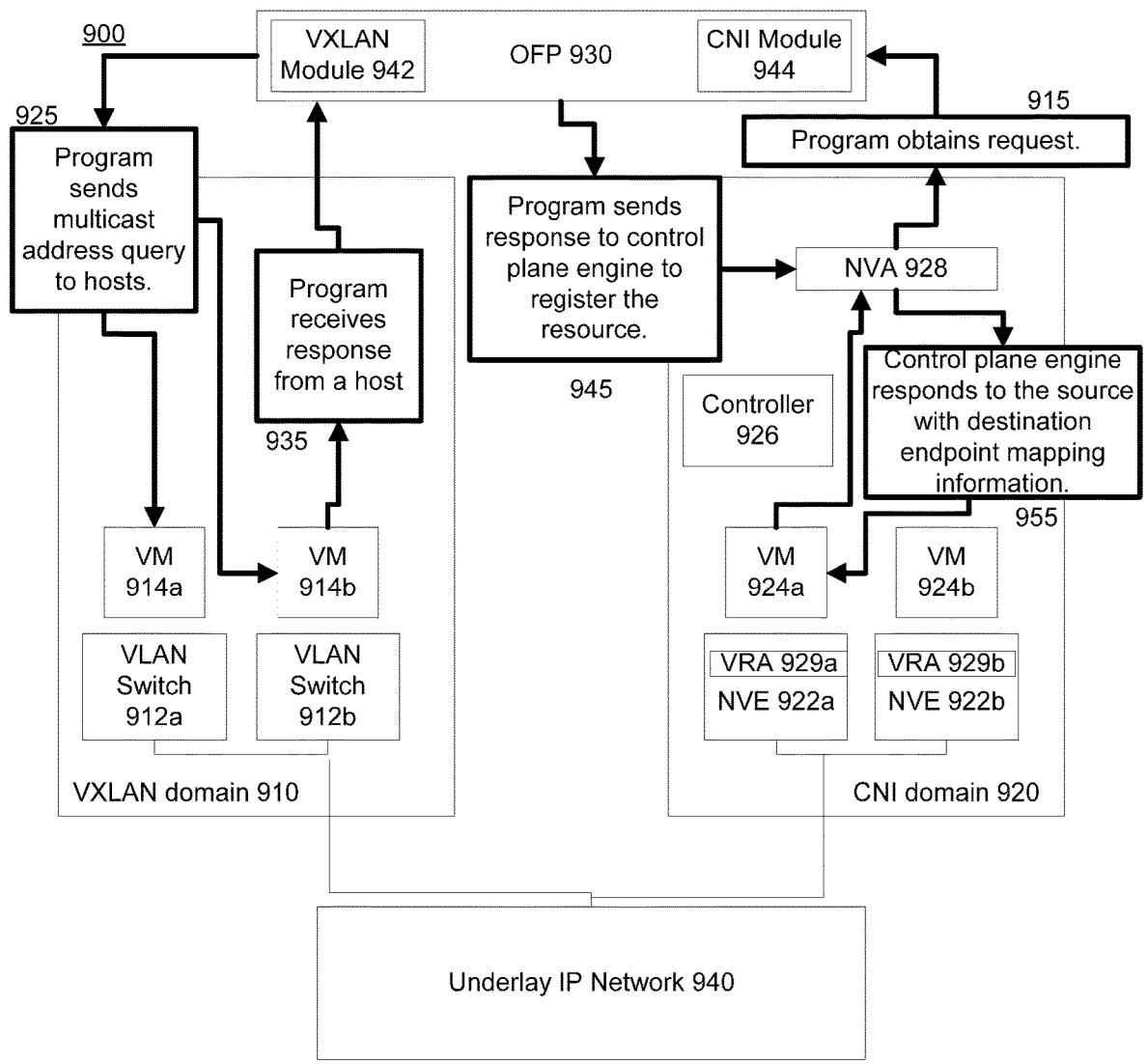
FIG. 9 depicts certain aspects of an embodiment of the present invention utilizing the architecture depicted in FIG. 5.

While FIGS. 6-7 depict workflows that include communications from a first domain, an overlay network utilizing an overlay solution without a dedicated CP, to a second domain, an overlay network utilizing an overlay solution with a domain CP engine, FIGS. 8-9 depict the opposite communication, from the second domain to the first domain, in accordance with certain aspects of an embodiment of the present invention. Specifically, FIG. 8 depicts a resource in the second domain resolving for a resource (endpoint) in the first domain. In an embodiment of the present invention, at least one of the resources is a VM. In an embodiment of the present invention, the second domain in CNI domain 520 and the first domain is VXLAN domain 510. In an embodiment of the present invention, the communication between these domains is managed through a proxy, for example, the aforementioned OFP 530.

As with FIG. 6, in FIG. 8, elements of the example topography of FIG. 5 are utilized in the description of workflow 800. This topography is only offered for ease of understanding and is only an example of one topography in which aspects of some embodiments of the present invention may be implemented.

FIG. 8 illustrates a workflow that commences when one or more program 440 obtains an address request from a domain control plane engine. Before one or more program 440 obtains the request, certain events may occur within the technical environment in which aspects of the present invention are implemented. In an embodiment of the present invention, when a resource in the second domain (e.g., VMs 524a-524b), which can be CNI domain 520, seeks address information for another resource, the resource in the second domain queries the domain CP engine (e.g., NVA 528)) to locate the destination endpoint. Without this endpoint information, the resource in the second domain cannot communicate directly with another resource. Thus, in this example, the resource in the second domain can communicate directly with resources that are registered in the domain CP engine. Thus, when a resource in the first domain queries the domain CP engine for endpoint mapping information related to a resource in the first domain and the domain CP engine cannot find the destination endpoint mapping information, the domain CP engine floods all hosts within the second domain, including but not limited to, hosts related to a proxy, for example OFP 530, which may include one or more program 440.

Referring first to the workflow 800 of FIG. 8, one or more program 440 (FIG. 4) obtains a request for a host address endpoint in a first domain from a domain control plane engine in the second domain (815). The request may comprise an ARP request from a CP engine in CNI domain 520 for a host address in VXLAN domain 510. In an embodiment of the present invention, this request can originate as a request from a host of resources, such as VMs 524a-524b within the second domain. The host can request information, such as VM-host mapping information related to the first domain from the domain CP engine of the second domain. Based on the CP engine not having the information requested, the CP engine can broadcast the request to all hosts to which it was communicatively coupled, including to one or more program 440, which may be executed by a resource in a proxy, including but not limited to, OFP 530, which is communicatively coupled to the resources of the second domain. In an embodiment of the present invention, the CP engine is NVA 528 in CNI domain 520.

In an embodiment of the present invention, based on obtaining the request, the one or more program 440 sends a multicast address query to hosts in the first domain (825). Responsive to this query, one or more program 440 receives a response from a host in the first domain (835). In an embodiment of the present invention, this host is the host of certain resources in the domain, including but not limited to VMs. For example, in an embodiment of the present invention where the first domain is VXLAN domain 510, the host may be VXLAN switch 512a-512b and the resource may be VM 514a-514b hosted by the VXLAN switch 512a-512b.

In response to receiving the response, the one or more program 440 sends the response to the CP engine of the second domain to register the resource from the first domain in the CP engine (845). Based on the one or more program 440 registering the resource in the CP engine, the CP engine replies to the host in the second domain, which originated the request. The one or more program 440 can register the resource in the CP engine by creating a mapping for the resource in the CP engine. In an embodiment of the present invention, the one or more program 440 registers the resource from the first domain in the same way that the resources in the second domain are registered in the CP engine. Thus, in an embodiment of the present invention where the first domain is VXLAN domain 510 and the second domain is CNI domain, the one or more program 440 gathers the reply, which may be a response to an AFP request, and registers the resource, for example, VM 514a-514b from the VXLAN domain 510, to the NVA 528 in the CNI domain 520, in the same manner that the hosts in the CNI domain 510, such as NVEs 522a-522b, register a resource in the CNI domain 510, such as VMs 524a-524b. In an embodiment of the present invention, the CP engine responds to the source endpoint in the second domain with the destination endpoint mapping information from the first domain, enabling the source in the second domain to send traffic to this destination in the first domain (855).

Registering resources from the first domain in the CP engine of the second domain enables intra-domain communications by providing VM-host mapping info. In an embodiment of the present invention, in response to the host receiving this reply from the CP engine, the host can send traffic to the resource in the first domain. In an embodiment where the second domain is CNI domain 520, the CP engine can be NVA 528 and the host can be NVE 522a-522b. For example, with the mapping information, NVE 522a-522b can find the tunnel resolution for the requested resource (e.g., VM 514a-514b) in a data structure, such as a table, in the CP engine (e.g., NVA 528). In an embodiment of the present invention, after registration is complete, endpoint (VM) information matching the request of the CNI domain 520 is known to the corresponding NVE 522a-522b and the requesting VM 524a-524b. Thus, the VM 524a-524b in the CNI domain 520 can send the traffic to the VM 514a-514b in VXLAN domain 510. A VM 524a-524b can send VXLAN packets to a known host in the VXLAN domain 510 directly.

FIG. 9 depicts certain aspects of an embodiment of the present invention utilizing the architecture depicted in FIG. 5. As aforementioned, this architecture provides one example of a possible topography for a system into which aspects of the present invention may be implemented. This is merely one example of an implementation, as understood by one of skill in the art. Overlaying aspects of embodiments of the present invention on an example architecture assists in illustrating aspects of the invention, which is why this technique is employed herein.

As seen in FIG. 9, one or more program 440 (FIG. 4), in this example, executing on a resource in an OFP 930, obtains a request for a host address endpoint, VM 914*b*, in a first domain, VXLAN domain 910 from a domain CP engine, NVA 928, in the second domain, CNI domain 920 (915). As explained above, prior to the one or more program 440 obtaining the request, a source endpoint, VM 924*a* in CNI domain 920 queries the CP engine, NVA 928, to locate a destination endpoint. VM 924*b* may also originate this request. As explained above, each resource, e.g., VM 924*a* and/or VM 924*b*, is associated with an NVE, e.g., NVE 922*a* and/or NVE 922*b*. In an embodiment of the present invention, each NVA includes a VRA, depicted in the example as VRA 929*a* and VRA 929*b*, to enabling these CNI resources to communicate with the VXLAN resources driven by the OFP 930.

Based on one or more program 440 executing on a resource in the control plane engine, NVA 928, not locating the destination endpoint, one or more program 440 in the CP engine, NVA 928, floods all hosts such that the one or more program 440 executing on the OFP 930 obtains this request. It is at this point that the one or more program 440 obtains the aforementioned request.

Returning to FIG. 9, the one or more program 440 sends a multicast address query to hosts in the first domain, VXLAN domain 910 (925). As illustrated in FIG. 9, VM 914*a* and VM 914*b* both receive the multicast query. The one or more program 440 receives a response from a host, VXLAN switch 912*b*, which hosts endpoint requested, VM 914*b*, in the first domain, VXLAN domain 910 (935). After receiving the response, the one or more program 440 sends the response to the CP engine, NVA 928, of the second domain, CNI domain 920, to register the resource from the first domain, VXLAN 910, in the CP engine, NVA 928 (945). One or more program 440 in the CP engine responds to the source endpoint in the second domain, VM 924*a*, with the destination endpoint mapping information from the first domain, the mapping to VM 914*b*, enabling the source in the second domain, VM 924*a*, to send traffic to this destination in the first domain (955).

In an embodiment of the present invention, communications to the OFP 930 to and from the VXLAN domain 910 may be received and sent by a VXLAN Module 942 in the OFP 930. Communications to and from the CNI domain 920 may be received and sent by a CNI Module 944 in the OFP 930. In an embodiment of the present invention, endpoints may be registered on the controller 926.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method comprising:
   obtaining, by one or more processors, a request from a control plane engine for a first host address endpoint, wherein the control plane engine obtained the request from a second host and, wherein a shared computing environment comprises the first host, the second host, and a group of hosts comprising a third host;
   based on obtaining the request for the first host address endpoint, sending, by the one or more processors, a multicast address query to the group of hosts;
   responsive to the query, receiving, by the one or more processor, a response from the third host to the request for the first host address endpoint; and
   sending, by the one or more processors, the response to the control plane engine to register at least one resource hosted by the third host in the control plane engine.

2. The computer-implemented method of claim 1, wherein based on registering the resource in the control plane engine, the control plane engine replies to the second host and the second host sends data directly to the third host.

3. The computer-implemented method of claim 1, wherein a first domain comprises the first host and the third host, the first domain further comprises a Centralized NVO3 Implementation (CNI) overlay solution and a second domain comprises the control plane engine, the second domain further comprising a Virtual Extensible Local Area Network (VXLAN) overlay solution.

4. The computer-implemented method of claim 1, wherein a first domain comprises the first host and a second domain comprises control plane engine, and the first domain and the second domain comprise different overlay solutions.

5. The computer-implemented method of claim 1, further comprising:
   obtaining, by the one or more processor, an address resolution request from a first resource in a first domain for a second resource in a second domain;
   obtaining, by the one or more processor, source information from the address resolution request;
   registering, by the one or more processor, the source information to the control plane engine, and utilizing the address resolution request to query the control plane engine to locate the second resource in the second domain, wherein the second resource matches the address resolution request;
   receiving, by the one or more processor, a response from the control plane engine identifying the first host, wherein the first host is in the second domain and is the host of the second resource; and
   sending, by the one or more processor, a notification request to the first host requesting that the first host reply to the address resolution request.

6. The method of claim 5, wherein the notification request includes an instruction to reply to the address resolution request in pre-defined format.

7. The method of claim 5, wherein the first domain is devoid of a dedicated control plane.

8. The method of claim 5, wherein the source information comprises VM tunnel resolution information from the first resource.

9. The method of claim 5, wherein the identifying the first host comprises sending, by the one or more processor a broadcast to hosts in the second domain.

10. The method of claim 9, wherein the address resolution request comprises an encapsulated packet, the encapsulated packet comprising a header and encapsulated by a host in the first domain communicatively coupled to the first resource.

11. The method of claim 10, wherein the obtaining the source information comprises decapsulating the header of the address resolution request.

12. The method of claim 6, wherein the format of the address resolution request and the pre-defined format are identical.

13. The method of claim 5, further comprising:
   obtaining, by the one or more processor, the request and based on the obtaining, sending a reply directly from the second resource to the first resource.

14. A computer program product comprising:
   a computer readable storage medium readable by one or more processor and storing instructions for execution by the one or more processor for performing a method comprising:
      obtaining, by the one or more processors, a request from a control plane engine for a first host address endpoint, wherein the control plane engine obtained the request from a second host and, wherein a shared computing environment comprises the first host, the second host, and a group of hosts comprising a third host;
      based on obtaining the request for the first host address endpoint, sending, by the one or more processors, a multicast address query to the group of hosts;
      responsive to the query, receiving, by the one or more processor, a response from the third host to the request for the first host address endpoint; and
      sending, by the one or more processors, the response to the control plane engine to register at least one resource hosted by the third host in the control plane engine.

15. The computer program product of claim 14, wherein based on registering the resource in the control plane engine, the control plane engine replies to the second host and the second host sends data directly to the third host.

16. The computer program product of claim 14, wherein a first domain comprises the first host and the third host, the first domain further comprises a Centralized NVO3 Implementation (CNI) overlay solution and a second domain comprises the control plane engine, the second domain further comprising a Virtual Extensible Local Area Network (VXLAN) overlay solution.

17. The computer program product of claim 15, wherein a first domain comprises the first host and a second domain comprises control plane engine, and the first domain and the second domain comprise different overlay solutions.

18. The computer program product of claim 14, the method further comprising:
   obtaining, by the one or more processor, an address resolution request from a first resource in a first domain for a second resource in a second domain;
   obtaining, by the one or more processor, source information from the address resolution request;
   registering, by the one or more processor, the source information to the control plane engine, and utilizing the address resolution request to query the control plane engine to locate the second resource in the second domain, wherein the second resource matches the address resolution request;
   receiving, by the one or more processor, a response from the control plane engine identifying the first host, wherein the first host is in the second domain and is the host of the second resource; and
   sending, by the one or more processor, a notification request to the first host requesting that the first host reply to the address resolution request.

19. A system comprising:
   a memory;
   one or more processor in communication with the memory; and
   program instructions executable by the one or more processor via the memory to perform a method, the method comprising:
      obtaining, by the one or more processors, a request from a control plane engine for a first host address endpoint, wherein the control plane engine obtained the request from a second host and, wherein a shared computing environment comprises the first host, the second host, and a group of hosts comprising a third host;
      based on obtaining the request for the first host address endpoint, sending, by the one or more processors, a multicast address query to the group of hosts;
      responsive to the query, receiving, by the one or more processor, a response from the third host to the request for the first host address endpoint; and
      sending, by the one or more processors, the response to the control plane engine to register at least one resource hosted by the third host in the control plane engine.

20. The system of claim 19, the method further comprising:
   obtaining, by the one or more processor, an address resolution request from a first resource in a first domain for a second resource in a second domain;

obtaining, by the one or more processor, source information from the address resolution request;

registering, by the one or more processor, the source information to the control plane engine, and utilizing the address resolution request to query the control plane engine to locate the second resource in the domain, wherein the second resource matches the address resolution request;

receiving, by the one or more processor, a response from the control plane engine identifying the first host, wherein the first host is in the second domain and is the host of the second resource; and sending, by the one or more processor, a notification request to the first host requesting that the first host reply to the address resolution request.

* * * * *